Patented June 19, 1945

UNITED STATES PATENT OFFICE 2,378,886

2,378,886

VARNISH RESIN AND METHOD OF MAKING SAME

Herbert F. Weide, Los Angeles, Calif., assignor to Monsanto Chemical Company, a corporation of Delaware No Drawing. Application March 18, 1943, Serial No. 479,592

17 Claims. (Cl. 260—22)

My invention relates generally to the production of varnish resins and more particularly to an improved alkyd varnish resin, useful in a great many products of the paint industry.

The synthetic resins commonly used in the manufacture of varnishes may be divided generally into two main classes, to wit: the phenol resins and the alkyd resins. The latter group of resins, while having many advantages over the phenol type resin, has not come into as wide use as might be because they are very slow through-drying and are not very water resistant. However, they have other very desirable properties such as high gloss, excellent durability, eventual toughness of film, and good baking properties.

By the expression "alkyd varnish resin" as used herein, I mean to include those synthetic resins which are known as modified polyhydric alcohol polybasic acid resins, which are most commonly made by suitably reacting a polyhydric alcohol, such as glycerine, a polybasic acid, such as phthalic anhydride, and a normally liquid unsaturated fatty oil or unsaturated fatty acid with or without additional modifying natural or synthetic resins. In the manufacture of such synthetic resins, the excess phthalic anhydride may be blown out with $CO_2$ at the proper point in their reaction, and volatile thinners are added.

The normally liquid unsaturated oil or unsaturated fatty acid may be oleic acid, linoleic acid, linolenic acid or the various normally liquid unsaturated fatty acid mixtures obtained from natural products by saponification of the glycerides thereof. Naturally occurring unsaturated oils may be corn oil, cotton seed oil, soya bean oil, perilla oil or linseed oil. Cotton seed oil and corn oil are generally considered to be non-drying or semi-drying oils, while linseed, perilla and soya bean oil are considered to be drying oils. For the purpose of the present invention, unsaturated oils or unsaturated oil acids generally may be employed. Excluded from the scope of this invention are the saturated oils or oil acids whether such saturated oil is a natural product or is chemically prepared as by hydrogenation or arylation. An example of an unsuitable fatty acid in my composition is stearic acid. This acid tends to precipitate out of the resin upon cooling and forms waxy films of little or no gloss.

The major object of my invention is to provide an alkyd varnish resin and a method of making same, which resin will exhibit improved through-drying and water resisting properties to a marked degree, and which will also have a lower acid number, increased durability, a lower cost of manufacture on a non-volatile basis, enhanced gloss, increased tolerance for petroleum solvents, better baking properties, and decreased tendency for polymerized particles to persist in the finished resin solution.

In general, I accomplish this major object of my invention by incorporating a substantial quantity of naphthalene, in the manufacture of the resin at an early stage in the reaction.

Another object of my invention is to provide a novel method for producing one phase in an alkyd varnish resin reaction mixture within a much shorter time than is usually necessary when employing a high percentage of drying oil.

In making alkyd varnish resins, the order in which the various ingredients must be added to the reaction mixture depends largely upon the particular formula being used. The guiding principle is to condition the reaction mixture, so that all ingredients will eventually form one phase as the reaction proceeds. An additional requirement is that the resin constituents should form one phase after the resin has cooled and also after dilution with the various thinners used in the art.

The following examples are illustrative of the very large number of possible alkyd varnish resin formulas to which my invention may be applied, but it is to be understood of course that these examples are given purely by way of illustration, and that my invention is applicable to the production of alkyd varnish resins other than those herein illustrated.

Case #1

If the formula contains glycerine, phthalic anhydride, and drying oils, semi-drying oils, or non-drying oils, a satisfactory procedure is to cook the glycerine and oils together at a temperature of 450° F. to 540° F., or even as high as 550° F. to 560° F. until one phase is reached, then to add the phthalic anhydride and naphthalene, and cook to completion.

Case #2

If the formula contains glycerine, phthalic anhydride, drying oils, and drying oil acids in relatively small amounts, the glycerine, oils, and acids may be cooked until one phase results then the phthalic anhydride and naphthalene may be added, and the reaction carried to completion.

Case #3

If the formula contains glycerine, phthalic anhydride, drying oils, and relatively large amounts of drying oil acids, all the ingredients, including naphthalene, may be cooked together from the start. One phase will result and the resin may be satisfactorily completed.

Case #4

If the formula contains glycerine, phthalic anhydride, and drying oil acids, but no drying oils, all the ingredients, including naphthalene, may be added at the beginning of the reaction, and one phase will result so that the resin may be completed.

Case #5

If the formula contains rosin, glycerine, phthalic anhydride, and drying oils, a satisfactory procedure is to cook the rosin, glycerine, and the oils together until one phase is obtained, then to add the phthalic anhydride and naphthalene, and cook to completion.

The same general schedule may be employed when semidrying and non-drying oils or oil acids are employed in whole or in part.

It is important to note at this point that simply dissolving naphthalene in a finished alkyd resin does not accomplish the beneficial results obtained when the naphthalene is added at an early stage of the action and is cooked with the ordinary ingredients, so that it affects the course of the reaction and becomes part of the final product.

To further illustrate particular embodiments of my invention, I will give the following specific examples of alkyd varnish resins made by me in the practice of my invention.

Example #1

In a suitable covered container, such as a 1500 cc. beaker, place 23 grams of linseed oil fatty acids, 220 grams raw perilla oil, and 105 grams U. S. P. glycerine; raise to a temperature of 540° F. in approximately 30 minutes and maintain at between 540° F. and 550° F. until one transparent phase results, which should be in approximately 40 minutes. The mixture should then be allowed to cool to approximately 500° F., and 190 grams of phthalic anhydride added and then 100 grams of naphthalene. At approximately 410° F. the reaction mixture will form one clear phase. The temperature should then be raised to approximately 500° F. in 25 minutes, and from 500° F. to 540° F. in about 20 minutes, where it should be held for approximately 30 minutes more. The mixture can then be cooled to approximately 400° F. in 15 minutes, and subsequently thinned to 60% resin with xylol or other suitable volatile solvent. Using the above formula, the losses are approximately 17 grams to the point where the phthalic anhydride is added and the total cook loss is approximately 75 grams. The acid number is approximately 22.2, based on non-volatile content, and the finished resin solution is light yellow in color and not very viscous. The viscosity may be increased by substituting for part of the thinner a petroleum solvent of higher aniline point, i. e. of less aromatic content. A varnish may be made from this resin solution in substantially conventional manner by thinning to 40% non-volatile content and adding naphthenate lead and cobalt driers to the amounts, lead metal 0.48% and cobalt metal 0.06% of non-volatile content, or other suitable varnish drier combinations.

I have found that a varnish made according to the foregoing directions dries dust free in about 10 minutes, and extremely hard and tough in 24 hours, and that after 48 hours air drying, the varnish will stand immersion in water for days without whitening.

That the naphthalene definitely controls the course of the reaction is shown by the fact that the acid number based on non-volatile content of the resin, made according to the foregoing example, is 22.2 while the acid number of an identical batch containing no naphthalene, is 36.7. Calculation shows that the lowering of the acid number is not simply a dilution effect of the naphthalene, since the acid number, based on non-volatile minus naphthalene content, is only 25; whereas as mentioned, it is 36.7 if the naphthalene only plays a solute role in the reaction.

Example #2

In a suitable covered container, place 75 grams WW rosin, 62 grams tung oil, 112 grams U. S. P. glycerine, 145 grams perilla oil; heat to approximately 540° F. in about 40 minutes, and hold between 540° F. and 550° F. until a clear phase results which should be in approximately 5 minutes. Cool to 500° F., add 190 grams phthalic anhydride, and then 100 grams of naphthalene. Heat to 500° F. in 50 minutes, hold at 500° F. for 30 minutes, cool to 400° F., and thin to 60% non-volatile content with xylol or other suitable volatile solvent. The total cook loss is approximately 56 grams, and the acid number is 18.4.

Example #3

In a suitable covered container, place 60 grams WW rosin, 62 grams tung oil, 110 grams U. S. P. glycerine, 145 grams perilla oil, heat to 540° F. in approximately 25 minutes; hold between 540° F. and 550° F. until one clear phase results (approximately 7 minutes); cool to 500° F.; add 190 grams of phthalic anhydride, 100 grams of naphthalene, and 15 grams of the commercial resin Bakelite BR-254 (a para-phenyl-phenol-formaldehyde resin). Heat to 500° F. in approximately 40 minutes, and hold for an additional 30 minutes; cool to approximately 400° F. and thin to 60% non-volatile content with xylol or other suitable volatile solvent.

It will be noted that in each of the last two examples, I add rosin to the glycerine and drying oil before cooking with phthalic anhydride. By this procedure, one clear phase results in a very short time—5 and 7 minutes, respectively—in Examples 2 and 3 once the mixture has been heated to the required temperature. Heretofore, it has been necessary, when not employing a drying oil acid, to cook the mixture for quite a long period of time (sometimes an hour or more) until one clear phase results. The rosin added at this early stage of the process reacts with the glycerine to form ester gum and performs the additional function of facilitating the attainment of one reaction phase upon the addition of phthalic anhydride. While the addition of rosin to the mixture at the beginning produces the beneficial effects just noted, this addition also somewhat lowers the durability of the resulting product, so that excessive quantities of rosin should not be used. I have found that the percentages of rosin set forth in Examples 2 and 3 are about the maximum amount permissible for a satisfactory product.

Example #4

In a suitable covered container, place 222 grams perilla oil acids, 126 grams U. S. P. glycerine, 190 grams phthalic anhydride, 100 grams naphthalene. Heat to 340° F. in approximately 25 minutes, at which point the reaction mixture will consist of one clear phase. Heat to 500° F. in 25 minutes, and then to 530° F. in 20 minutes. Cool to 400° F. and thin to 60% non-volatile content with xylol. The acid number of this resin based on non-volatile content will be approximately 13.2, with a total cook loss of approximately 85 grams.

Experiments have shown that a resin made in accordance with Example #4, except without the naphthalene, has an acid number of approximately 36, with a cook loss of 43 grams with the same heat treatment. In all of the foregoing examples, the temperatures given are those read when the thermometer is substantially centered in the receptacle, and extends down through the liquid to contact the base of the receptacle. However, due to the reaction, the temperature is practically uniform throughout the reaction mixture.

*Example #5(a)*

In a suitable covered container place 91 grams of linseed oil fatty acids, 46 grams of glycerine, 89 grams of phthalic anhydride and 40 grams of naphthalene (i. e. 16% by weight). Heat to a temperature of 480° F. for 1 hour. During heating no crystals of phthalic anhydride collected upon the container walls, a loss of 10.5 grams occurred upon heating. The resin was cooled and thinned by the addition of mineral spirits to a solid content of 50%. The color of the resulting varnish was pale.

*Example #5(b)*

A second varnish was made using the same ingredients and the same procedure as above, but excluding naphthalene. A loss of 8.5 grams was observed upon cooking. During cooking a heavy crust of crystals formed on the container walls. Such crystals may result in loss of phthalic anhydride or cause inhomogeneity of the resin. The resin was cooled after cooking and thinned with mineral spirits to the same body as the varnish produced in (a). The resulting varnish contained only 30% of solids. The color of the varnish was dark.

The effect upon the body (i. e. viscosity) of the resulting varnish by the presence of naphthalene during the cook is illustrated strikingly by the results obtained with varnishes (a) and (b) of Example 5, above. It is there shown that the naphthalene containing resin can be thinned to the same viscosity and will then contain a higher solids content than the resin made without naphthalene. Such a naphthalene containing resin can also be thinned to a lower viscosity, and still have the same solids content as a resin made in the absence of naphthalene. It is apparent that the naphthalene exerts an effect on the molecular weight of the resin, causing generally a decreased molecular weight resin to be produced.

*Example #6(a)*

230 grams of cotton seed oil and 110 grams of glycerine were processed at 535° F. for 1¼ hours in order to form the monoglycerides (monoester) of the cotton seed oil fatty acids.

*Example #6(b)*

A 40 gram sample of the monoglycerides thus produced was then mixed with 22.5 grams of phthalic anhydride and 12.5 grams of naphthalene, processed to 550° F. for 35 minutes. No crystals formed upon the container walls. The acid value of the resin was 19.5. It was then thinned to 60% solids with mineral spirits. Cobalt and lead driers were added. The color was pale and the varnish had a drying time of 2 hours to produce a non-tacky film. Exposed to cold water for 20 hours caused only a slight whitening of the film.

*Example #6(c)*

A second 40 gram sample of the monoglyceride produced in (a) was mixed with 22.5 grams of phthalic anhydride and then processed at the same time and temperature as above in (b). A heavy crust of crystals of phthalic anhydride formed on the container walls. The acid value of the resin was 21.5. It was thinned to 60% solids content with mineral spirits, and cobalt and lead driers added. The color of the varnish was dark, and showed a drying time of more than 2 hours. Exposure to cold water for 20 hours caused a bad whitening of the film.

As previously mentioned, I have found that the naphthalene does not act merely as a solute, but definitely controls the resulting resin complex. This has been established by making different batches of synthetic resins according to the same formulas, all factors being the same except that in one batch naphthalene was added as indicated hereinbefore and in the control batch, no naphthalene was added. In each instance, the resulting varnish made from the resin in which the naphthalene was added during an early stage of the cooking showed a much lower acid number than would be explained by the presence of naphthalene as solute only, and was able to withstand immersion in water for a long time, whereas the control batches made without naphthalene whitened badly upon 24 hour immersion in water, and were slower through-drying. Similar tests were made by adding naphthalene to the control batches after they were cooked, and it was found that they reacted in substantially the same manner as though no naphthalene had been added.

I have found that in order to get good results from the addition of naphthalene to the reaction mixture in accordance with my invention, that a minimum of 10% naphthalene should be added to the mixture, although lesser amounts do exert a proportionally beneficial effect. I have also found that any naphthalene added in excess of 20% is substantially wasted in that it boils off and no appreciable increase of beneficial effect is obtained. The results obtained by me in the practice of my invention to date indicate that the ideal quantities are between approximately 13 and 16% naphthalene, although it will be understood, as mentioned, that lesser or greater amounts may be used with correspondingly different degrees of improvement. Percentages of naphthalene are based upon total resin ingredients, i. e., upon the total weight of polybasic carboxylic acid, polybasic alcohol, oil or oil acid and naphthalene. The reaction should be carried out at temperatures above the boiling point of naphthalene which is 218° C. or 424.4° F. and preferably at temperatures above 450° F. The temperature may range between 450° F. and 540° F. or even 550° F. to as much as 560° F.

The reaction is moreover carried out in the absence of hydocarbon solvents such as naphthas of various types, particularly because of the difficulty of completely eliminating such solvents from the resinous bodies.

In the formation of the above described varnish resins varying amounts of naphthalene remain in the final product. The naphthalene lost during the resin forming reaction constitutes about one-half to three-fourths of the original quantities employed. This may vary somewhat depending upon the reaction conditions. In general the resin finally contains approximately 3 to about 10% by weight of naphthalene.

While I have given various specific examples of my invention, they are to be understood as illustrative only, and I do not mean to in any way limit myself thereto, except as required by the appended claims.

This application is a continuation-in-part of application Serial No. 293,617, filed September 6, 1939.

What I claim is:

1. The method of producing an alkyd resin which includes heating together to a temperature of at least 424.4° F. a monoglyceride of a normally liquid unsaturated fatty acid derived by saponification from a naturally occurring glyceride with phthalic anhydride in the presence of naphthalene.

2. The method of producing an alkyd resin which comprises heating together at a temperature above the boiling point of naphthalene a monoglyceride of a normally liquid unsaturated fatty acid derived by saponification from a naturally occurring glyceride with phthalic anhydride in the presence of naphthalene.

3. The process defined in claim 2 in which the amount of naphthalene employed is between 10% and 20% by weight of said resin.

4. The process defined in claim 2 in which the heating is continued until one clear phase results.

5. The method of producing an alkyd resin which includes heating together at a temperature between 450° F. and 550° F. a normally liquid oil selected from the class consisting of unsaturated fatty acid oils of natural origin and unsaturated fatty acids derived by saponification from a naturally occurring glyceride, with glycerine and phthalic anhydride, said reaction being carried out in the presence of naphthalene.

6. The method of producing an alkyd resin which includes heating together a normally liquid oil selected from the class consisting of unsaturated fatty acid oils of natural origin and unsaturated fatty acids derived by saponification from a naturally occurring glyceride with glycerine and then heating said product at a temperature in excess of 424.4° F., in the presence of naphthalene, with phthalic anhydride.

7. The method defined in claim 6 in which the amount of naphthalene employed is approximately 13 to 16% by weight of said resin.

8. The method of producing an alkyd resin which comprises reacting glycerine with linseed oil fatty acids and raw perilla oil at a temperature between 450° F. and 550° F. until one transparent phase results, cooling the mixture, adding phthalic anhydride and naphthalene, progressively heating the mixture to effect a reaction, then again cooling said reaction mixture and subsequently thinning the same with a volatile solvent.

9. The method of producing an alkyd resin which comprises reacting glycerine with rosin, tung oil and perilla oil until a clear phase results, cooling the reaction mixture, adding phthalic anhydride and naphthalene and heating the mixture at a temperature above the boiling point of naphthalene to effect a reaction, then again cooling said reaction mixture and thinning the product with a volatile solvent.

10. The method of producing an alkyd resin which comprises reacting glycerine, phthalic anhydride and perilla oil acids in the presence of naphthalene until one clear phase results, progressively heating the mixture to a temperature of at least 424.4° F. to effect a reaction, cooling said reaction mixture and thinning the same with xylol.

11. The method of producing an alkyd resin which comprises reacting glycerine, linseed oil fatty acids and phthalic anhydride in the presence of naphthalene at a temperature of 480° F., cooling and thinning the resin by the addition of mineral spirits, to a solids content of about 50%.

12. The method of producing an alkyd resin which comprises reacting glycerine with cotton seed oil to form the corresponding monoglycerides, then reacting the monoglycerides with phthalic anhydride in the presence of naphthalene at a temperature above the boiling point of naphthalene and thinning the product of the reaction with mineral spirts.

13. The method of producing an alkyd resin which includes heating glycerine with a normally liquid oil selected from the class consisting of unsaturated fatty acid oils of natural origin and unsaturated fatty acids derived by saponification from a naturally occurring glyceride to form the corresponding monoglycerides, and then heating the monoglycerides with phthalic anhydride in the presence of naphthalene said heating being carried out at a temperature above the boiling point of naphthalene.

14. A water-resistant alkyd resin formed by heating to a temperature above 424.4° F. in the presence of naphthalene a normally liquid oil selected from the class consisting of naturally occurring unsaturated fatty acid oils and unsaturated fatty acids derived by saponification from a naturally occurring glyceride with glycerine and phthalic anhydride.

15. A water-resistant alkyd resin of low acid number formed by heating a normally liquid oil selected from the class consisting of naturally occurring unsaturated fatty acid oils and unsaturated fatty acids derived by saponification from a naturally occurring glyceride with glycerine and then heating the product, in the presence of naphthalene, at a temperature above the boiling point of naphthalene with phthalic anhydride.

16. A water-resistant alkyd resin of low acid number formed by heating a normally liquid oil selected from the class consisting of naturally occurring unsaturated fatty acid oils and unsaturated fatty acids derived by saponification from naturally occurring glycerides with glycerine to form the corresponding monoglycerides, and then heating the monoglycerides with phthalic acid in the presence of naphthalene at a temperature above the boiling point of naphthalene.

17. The method of producing an alkyd varnish resin having a low acid-number and unusually good water resistance, which includes: cooking a mixture of glycerine, and a substance selected from the group consisting of naturally occurring unsaturated fatty acid oils and unsaturated fatty acids derived by saponification from a naturally occurring glyceride, at a temperature of approximately 540° F. until one clear phase results; cooling said mixture to approximately 500° F.; adding phthalic anhydride and naphthalene to said mixture; completing the cooking of said mixture between 500° F. and 540° F.; and cooling and thinning said mixture.

HERBERT F. WEIDE.